United States Patent [19]

Suzuka

[11] Patent Number: 5,664,233
[45] Date of Patent: Sep. 2, 1997

[54] REMOTE CONTROL APPARATUS OF CAMERA

[75] Inventor: Shinya Suzuka, Tokyo, Japan

[73] Assignee: Asahi Kogaku Kogyo Kabushiki Kaisha, Tokyo, Japan

[21] Appl. No.: 46,900

[22] Filed: Apr. 15, 1993

Related U.S. Application Data

[63] Continuation of Ser. No. 700,250, May 15, 1991, abandoned.

[30] Foreign Application Priority Data

| May 16, 1990 | [JP] | Japan | 2-126108 |
| Feb. 27, 1991 | [JP] | Japan | 3-16652 |
| Mar. 6, 1991 | [JP] | Japan | 3-19709 |

[51] Int. Cl.$^6$ .................................................. G03B 13/02
[52] U.S. Cl. ........................... 396/59; 396/373; 396/502
[58] Field of Search ............................... 354/219, 224, 354/225, 266

[56] References Cited

U.S. PATENT DOCUMENTS

| 3,829,870 | 8/1974 | Ogoro et al. | 354/266 X |
| 4,036,762 | 7/1977 | Troetscher et al. | 354/266 X |
| 4,693,582 | 9/1987 | Kawamuna et al. | 354/403 |
| 4,942,417 | 7/1990 | Miyazawa et al. | 354/195.1 X |
| 4,998,125 | 3/1991 | Watanabe et al. | 354/266 X |
| 5,014,080 | 5/1991 | Miyadera | 354/266 X |
| 5,092,673 | 3/1992 | Hayashi | 354/152 |

FOREIGN PATENT DOCUMENTS

| 2444355 | 4/1976 | Germany. |
| 0188528 | 3/1989 | Japan. |
| 0824141 | 11/1959 | United Kingdom. |
| 2119529 | 11/1983 | United Kingdom. |
| 2227099 | 7/1990 | United Kingdom. |
| 2238881 | 6/1991 | United Kingdom. |

OTHER PUBLICATIONS

Patent Abstract of Japanese (vol. 13, No. 319 (P–901)(3667), Jul. 19, 1989) of JP 1–088,528.

*Primary Examiner*—Howard B. Blankenship
*Attorney, Agent, or Firm*—Sandler Greenblum & Bernstein

[57] ABSTRACT

A remote control apparatus of a camera is provided which includes a signal emitter for emitting a remote release signal light, a camera body having a view finder, and an electromagnetic shutter. A half mirror is provided in the optical path of the view finder to partly transmit the remote release signal light therethrough and partly reflect the same. A light receiving element is provided behind the half mirror on the transmission side thereof, and a releasing device which releases the electromagnetic shutter of the camera body when the light receiving element receives the remote release signal light from the signal emitter is provided.

46 Claims, 13 Drawing Sheets

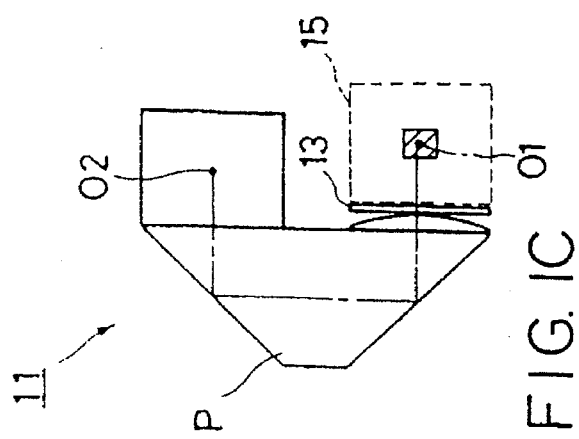
FIG. IC
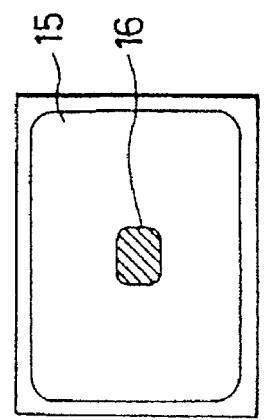
FIG. ID
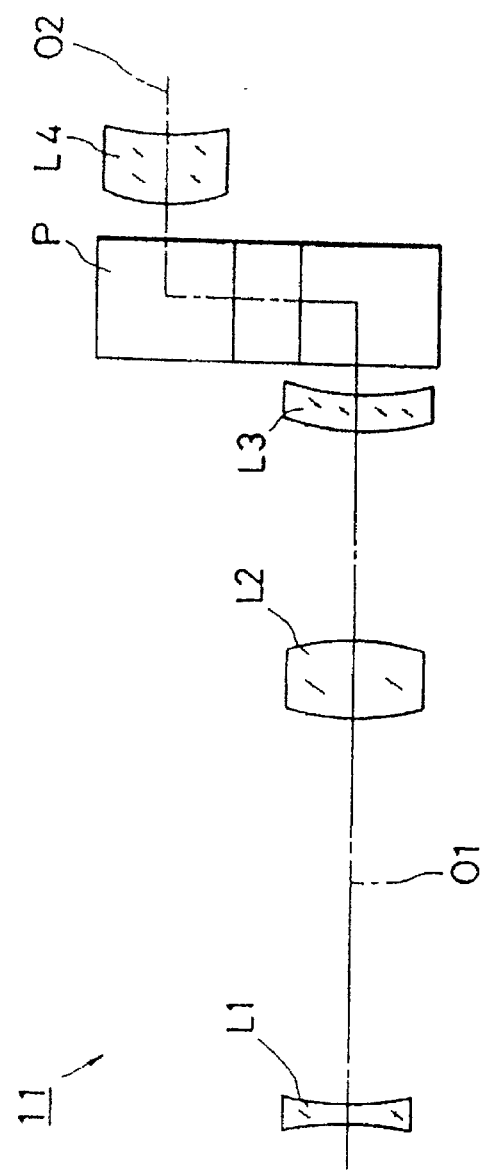
FIG. IA
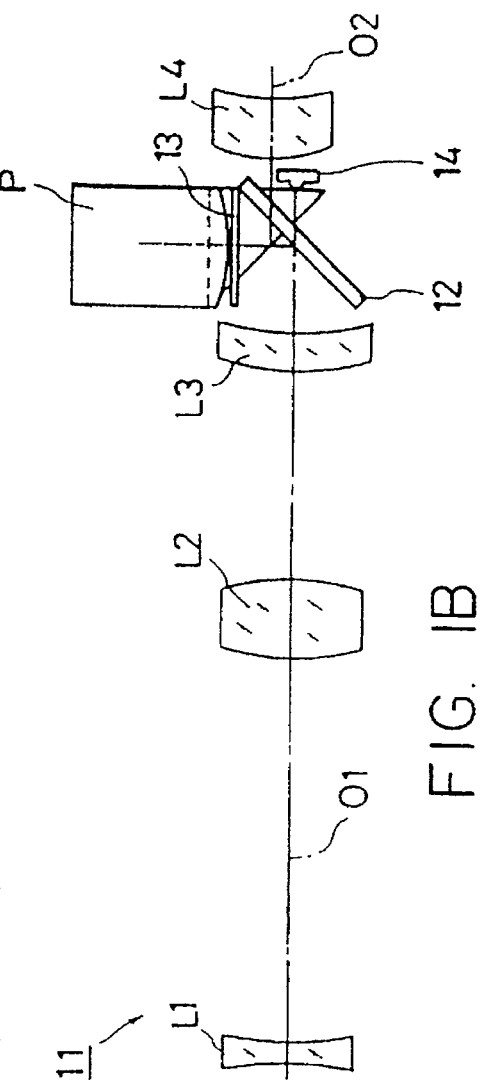
FIG. IB

REMOTE CONTROL APPARATUS OF CAMERA

This application is a continuation of application Ser. No. 07/700,250, filed May 15, 1991, now abandoned.

BACKGROUND OF THE INVENTION

1. Field of the Invention

The present invention relates to a remote control apparatus for remotely controlling the shutter of a camera.

2. Description of Related Art

A known remote controller for a shutter of a camera is basically comprised of a signal emitter (light emitter) and a signal receiver (light receiver) for emitting and receiving infrared rays (remote release signal light), respectively. The light receiver, which is provided on the camera body, is functionally connected to an electromagnetic shutter to actuate the shutter in response to the signal light (infrared rays) emitted by the light emitter and received by the light receiver. The light receiver of the remote controller is usually mounted to a hot shoe provided on the camera body so as to enable changing of the direction of the light receiving surface thereof in accordance with the expected position (direction) of an operator who carries the light emitter. Consequently, in the known remote controller, as mentioned above, it is not expected that the operator, carrying signal emitter, will be an object of the picture. Accordingly, upon taking a picture of the operator, it is impossible to confirm that the operator will be within the picture plane. In particular, in the case of a camera having a variable focal length of a photographing lens, such as a zoom lens camera or a two-focal length camera, etc., the variation of the angle of view corresponding to the change in the focal length makes confirmation more difficult. Furthermore, the releasing operation of the shutter of the presence of the operator in the picture area is not limited to the condition in which the operator is in focus. This is due to the fact that there is no means to detect whether or not the operator is within the object distance measuring zone when the picture is taken.

In addition to the foregoing, in a known camera having a remote controller, as mentioned above, it is either necessary to provide a plurality of light receiving portions, having light receiving surfaces facing in different directions, on the camera body, or to make the direction of the light receiving portion variable, in order to make use of the remote control in multiple directions possible. However, the provision of a plurality of light receivers or a mechanism for varying the direction of the light receiver results in complicated construction, increased manufacturing cost and limitations in freedom of camera design.

SUMMARY OF THE INVENTION

The primary object of the present invention is to provide a remote control apparatus for a camera in which, if an operator is to be photographed as a subject, the shutter cannot be released when the operator is outside the finder field of view (picture plane).

Another object of the present invention is to provide a remote control apparatus which can prohibit the shutter from being released. When, for example, the operator is not within a predetermined object distance range.

Still another object of the present invention is to provide a remote control apparatus for a camera having a zoom lens, in which a picture of an operator of the remote control apparatus can be accurately taken, and the magnification of an image thereof can be adjusted.

Still another object of the present invention is to provide a remote control apparatus for a camera, in which the remote control can be accomplished without providing a light receiver (signal receiver) on the outside surface of the camera body, regardless of whether the operator is at the front or rear side of the camera.

To achieve the objects mentioned above, according to the present invention, there is provided a remote control apparatus for a camera, comprising a signal emitter for emitting remote release signal light, a camera body having a view finder and an electromagnetic shutter, a half mirror located in the optical path of the view finder, to partly transmit and partly reflect the light passing along the optical path, a light receiving element on the transmission side of the half mirror, and a releasing mechanism for releasing the electromagnetic shutter when the light receiving element receives a remote release signal light emitted from the signal emitter.

The inventor of the present invention has focused on a real image type view finder in which the image of a subject to be graphed is formed on an image plane by an objective optical system to be observed through an eyepiece optical system. The inventor has found that if the light receiving element of the light receiver is located at a position conjugate with the image plane, a release signal emitted from out of the image plane will not be received by the light receiver, so that shutter release cannot be effected.

According to an aspect of the present invention, the light receiving element of the light receiver is located at a position substantially conjugate with the image plane of an objective optical system of a real image type view finder.

The real image type view finder is usually provided separately from a photographing optical system in a compact camera. On the other hand, in a single lens reflex camera, a real image type view finder is constituted by a photographing lens, mirrors, image plane, a pentagonal prism, and an eyepiece lens. Accordingly, the present invention can be applied to both the compact camera and the single lens reflex camera.

The light receiving range of the light receiving element of the light receiver can be switched (adjusted) between a "wide" range and a "narrow" range within the field frame (image plane). For instance, if the light receiving range is coincident with the field frame, the shutter cannot be released as long as the infrared release signal light is not emitted from within the field frame. Consequently, a picture of the operator (i.e. the light emitter) can be accurately taken. On the other hand, if the light receiving range is made coincident with the object distance range of an object (i.e. subject) distance measuring device provided in the field plane, the shutter cannot be released as long as the infrared release signal light is not emitted from within the object distance range. Accordingly, a picture in which the operator of the light emitter is "in focus" can be obtained.

In an embodiment of the invention, the switching (adjusting) mechanism for switching the light receiving range includes a first moving device for moving the light receiving element in the optical axis direction, and a second moving device for moving a condenser lens in association with the movement of the light receiving element between an advanced position, in which the condenser lens is in front of the light receiving element, and a retracted position, in which the condenser lens is retracted from the light receiving element. Alternatively, the switching mechanism can include of a mask which moves between the advanced position and the retracted position to decrease and increase the amount of light incident upon the light receiving element, respectively.

It is possible to provide another external light receiving element of the light receiver on the outer surface of the camera body, so that the external light receiving element and the internal light receiving element of the real image type of view finder can alternately be used to easily switch between a normal remote control mode and an operator taking mode.

According to another aspect of the present invention, there is provided a remote control apparatus comprising a zoom lens serving as a photographing lens, an object distance measuring mechanism for detecting the distance of an object to be photographed, and a light receiving range restricting device for making the light receiving range of a light receiver in the remote control apparatus coincident with an object distance range of the object distance measuring mechanism. A focal distance control device controlling the focal length of the zoom lens in accordance with the object distance detected by the object distance measuring mechanism is also provided.

The focal length control means controls the focal length of the zoom lens so that, for example, the magnification of an operator's image as a subject to be photographed, is a predetermined specific value.

According to another aspect of the present invention, a half mirror, through which light is partly transmitted, is provided in the light path of the view finder, so that the light receiver of the remote control apparatus is provided on the transmission side of the half mirror. In this arrangement, the electromagnetic shutter can be released when the release signal light is incident either from the front side of the view finder, i.e., from the objective lens side, or the rear side, i.e., from the eyepiece lens side. In other words, the shutter can be released regardless of the direction of the emission of the release signal, i.e., from the front side or from the real side of the camera.

The present disclosure relates to subject matter contained in Japanese patent application No.2-126108 (filed on May 16, 1990) and Japanese Utility Model applications No. 3-16652 (filed on Feb. 27, 1991) and No.3-19709 (filed on Mar. 6, 1991), which are expressly incorporated herein by reference in their entirety.

BRIEF DESCRIPTION OF THE DRAWINGS

The present invention will be described in detail with reference to the accompanying drawings as follows:

FIG. 1A is a front elevational view of a remote control apparatus according to a first embodiment of the present invention;

FIG. 1B is a plan view of FIG. 1A;

FIG. 1C is a side elevational view of FIG. 1A;

FIG. 1D is a front elevational view of the field of view of a view finder;

DESCRIPTION OF THE PREFERRED EMBODIMENTS

Figure 2C:
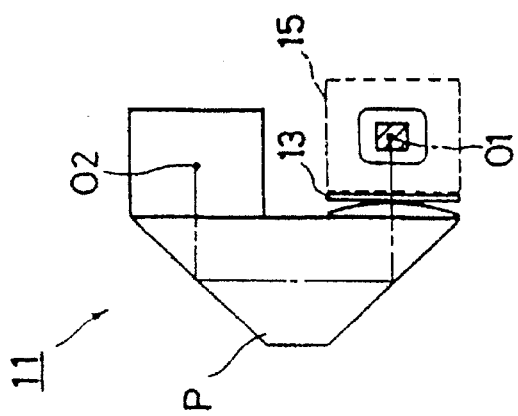
FIGS. 2A through 2D are views corresponding to FIGS. 1A through 1D, respectively, according to a second embodiment of the present invention.

FIGS. 1A through 1D show a first embodiment of the present invention, in which the shutter is not released as long as the infrared remote signal light is not emitted from the object distance range within a field frame of a view finder.

A real image type zoom finder 11 has an objective optical system including variable power lenses L1 and L2 and an immovable lens L3 on an optical axis O1. An image of an object formed by the objective optical system is converged onto a focusing plate (image plane) 13 located behind a half mirror 12. The image formed on the focusing plate 13 is observed through an eyepiece lens L4 provided on an optical axis O2 to constitute an eyepiece optical system and a Porro prism P. The Porro prism P inverts the image formed by the objective optical system in the vertical and horizontal directions.

According to one the most significant features, light receiving element 14 of a light receiver is located at a position optically conjugate with the focusing plate 13 with respect to the half mirror 12. The axial position of the light receiving element 14 on the optical axis O1 is such that the light receiving range thereof is coincident with an object distance measuring range 16 within a field frame 15, as shown in FIG. 1D, in which the light receiving range 16 of the light receiving element 14 is hatched.

Figure 7:
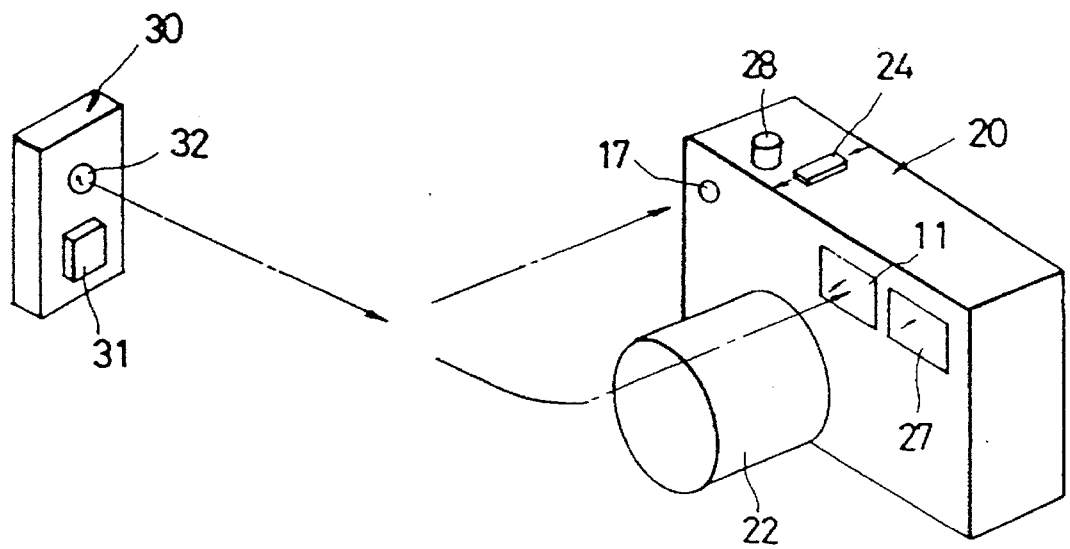
FIG. 7 is a perspective view of a signal emitter and a camera body, according to the present invention.

FIG. 7 shows a camera body 20 having a real image type zoom finder 11 and a light emitter (signal emitter) 30. The light emitter 30 has a trigger switch 31 and a light emitting portion 32, so that when the trigger switch 31 is pressed, infrared release signal light is emitted from the light beam emitting portion 32.

Figure 8:
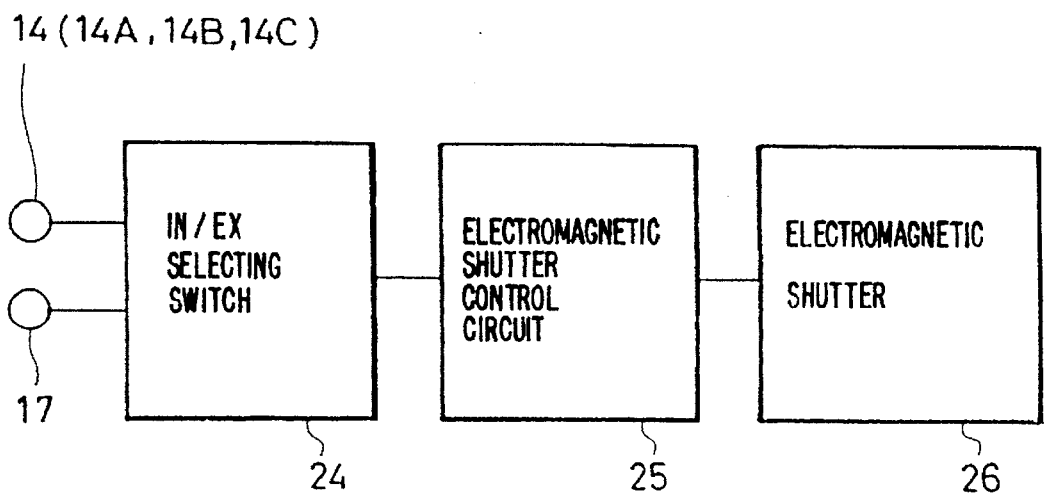
FIG. 8 is a block diagram of a switching circuit for switching a normal remote control mode and an operator taking mode, according to the present invention.
Figure 9:
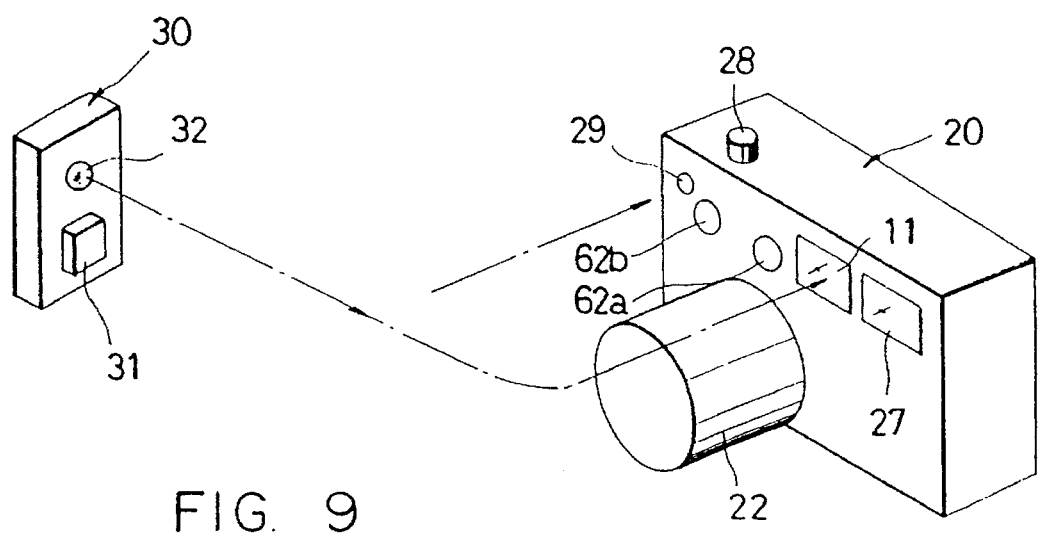
FIG. 9 is a perspective view of a signal emitter and a camera body, according to another aspect of the present invention.

The camera body 20 has a zoom photographing optical system 22 separate from the real image type zoom finder 11. The camera body 20 is provided on its front face with an external light receiving element 17 separate from the (internal) light receiving element 14. The internal and external light receiving elements 14 and 17 are connected to an electromagnetic shutter control circuit 25 through an internal/external light receiving element selecting switch 24 (which will be referred to as In/Ex selecting switch), as shown in FIG. 8. The shutter control circuit 25 actuates an electromagnetic shutter 26 provided in the camera body 20 when the infrared release signal light is incident upon the internal light receiving element 14 or the external light receiving element 17, selected by the In/Ex selecting switch 24. The In/Ex selecting switch 24 can be provided, for example, on the outer surface of the camera body 20. The zoom photographing optical system 22 of the camera body 20 and the real image type zoom finder 11 are associated with each other so that the photographing range (image plane) is substantially coincident with the field of view thereof upon zooming. The association mechanism is per se known. The camera body 20 is also provided with a strobe device 27 and a manual release switch 28.

In the remote control apparatus as constructed above, when the operator taking mode, in which only the input of the light signal to the light receiver 14 is valid, and the input of the light signal to the external light receiver 17 is null, is selected by the In/Ex selecting switch 24 of the camera body 20, shutter release cannot be effected as long as the infrared signal light is not emitted from within the object distance measuring range 16. Namely, since the light receiving range of the light receiving element 14 is limited to the object distance measuring range 16, even when the operator, outside the object distance measuring range 16, pushes the trigger switch 31 of the light emitter 30, to emit the infrared release signal light, the infrared light is not received by the light receiving element 14, so that the electromagnetic shutter 26 is not actuated by the shutter control circuit 25. Consequently, a picture of an operator in focus, who is most likely to be within the object distance measuring range 16, can be taken if the shutter is released. On the other hand, when the normal remote control mode, in which only the input of the infrared light signal to the external light receiving element 17 is valid and the input to the light receiving element 14 is null, is selected by the In/Ex selecting switch 24, remote-control photographing can be effected within the incident range. In this range, the infrared release signal light from the light emitting portion 32 of the light emitter 30 is received by the external light receiving element 17.

FIGS. 2A through 2D show a second embodiment of the present invention.

In this embodiment, the light receiving range of the light receiving element 14 is substantially identical to the photographing range of the field frame 15, so that the shutter is not released when the operator (more strictly speaking, the light emitting portion 32 of the light emitter 30) is outside the photographing range.

In the second embodiment, the light receiving element 14A is located more rearwardly than the light receiving element 14 of the first embodiment. A condenser lens (gathering lens) 18 is located between the light receiving element 14A and the half mirror 12. The condenser lens 18 gathers and converges the light incident upon the range of the field frame 15 of the focusing plate 13, i.e., the image plane, onto the light receiving element 14A. The light receiving range of the light receiving element 14A is hatched in FIG. 2D. In contrast to the first embodiment, the electromagnetic shutter 26 is released through the shutter control circuit 25 only when the infrared release signal light is emitted from the field frame (picture plane) 15. Consequently, in most cases, the operator carrying the light emitter 30 can be photographed. It goes without saying that the distance of an object within the object distance measuring range 16 is detected.

Figure 2D:
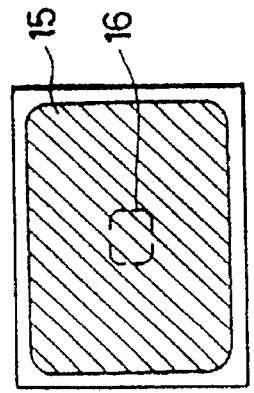
Figure 2A:
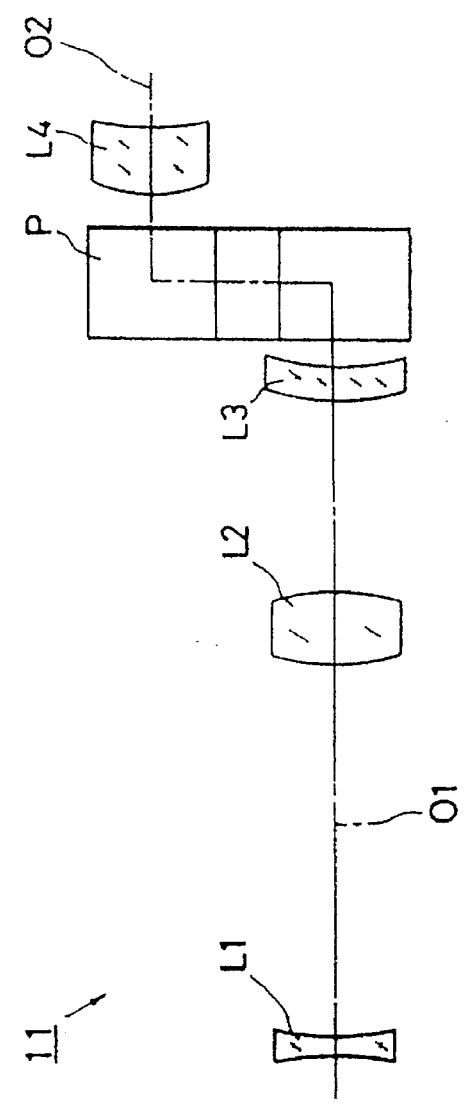
Figure 2B:
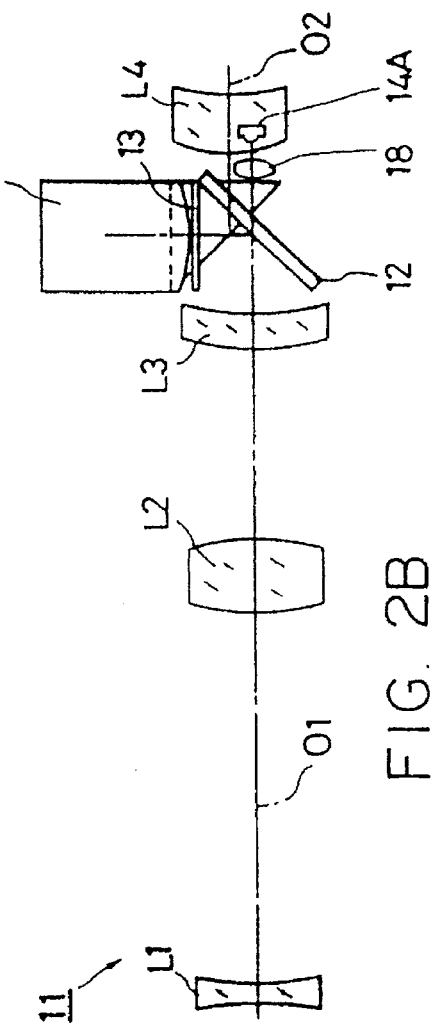
Figure 3A:
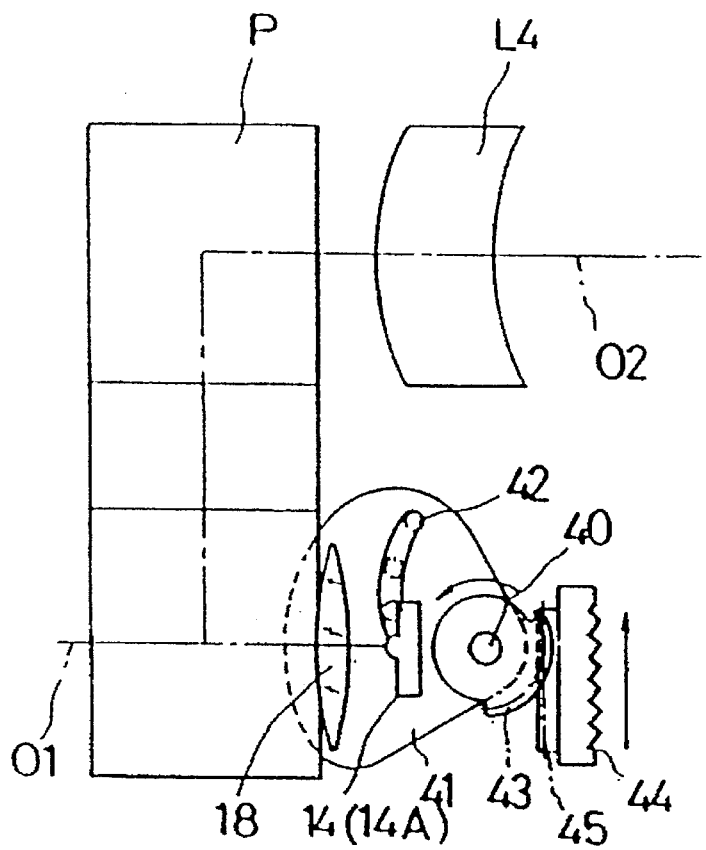
FIG. 3A is a front elevational view of a main part of a switching mechanism of light receiving range, corresponding to FIGS. 1A and 2A.
Figure 3B:
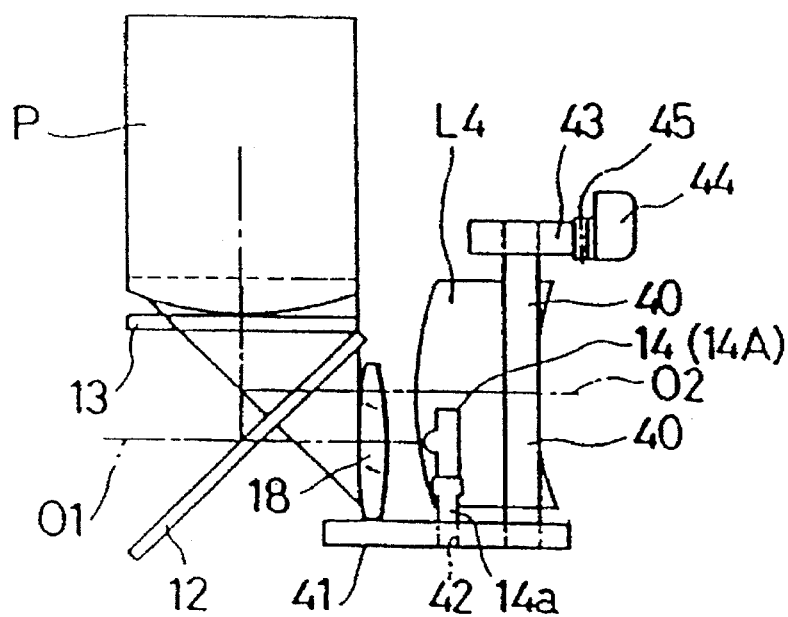
FIG. 3B is a plan view of a main part of FIG. 3A, corresponding to FIGS. 1B and 2B.
Figure 3C:
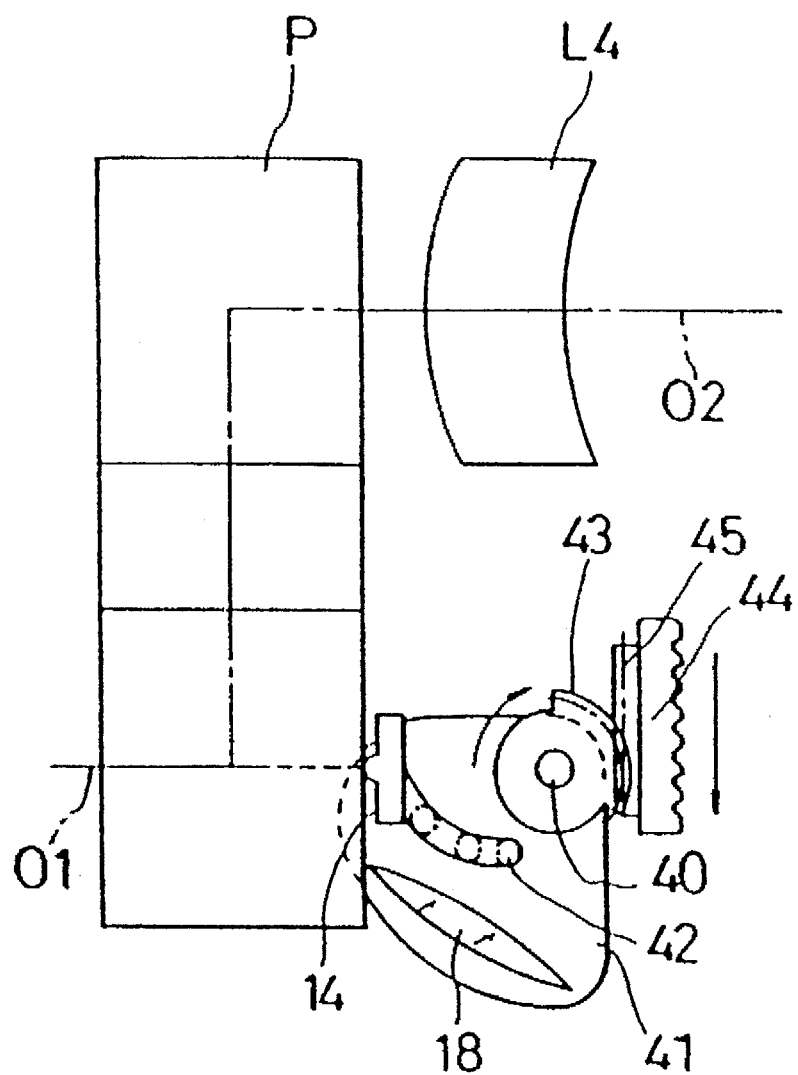
FIG. 3C is a front elevational view of a main part of a switching mechanism of a light receiving range, shown in a different operational position than in FIG. 3A.

FIGS. 3A through 3C show an embodiment of a mechanism for switching the light receiving range between a narrow range of the first embodiment and a wide range of the second embodiment. The light receiving element 14 is supported by a guide mechanism (not shown) so as to linearly move along the optical axis O1. On one side of the light receiving element 14 a cam plate 41 is provided which is rotatable about a shaft 40 together therewith in a plane parallel to the optical axis O1. The cam plate 41 has a cam groove 42 in which a drive pin 14a, secured to the light receiving element 14, is fitted. The condenser lens 18 is secured to the cam plate 41. The shaft 40 is provided, on its end far from the cam plate 41, with a sector gear 43 which is in mesh with a rack 45 provided on a slide lever 44. Consequently, the slide movement of the slide lever 44 causes the cam plate 41 to rotate through the rack 45, the sector gear 43 and the shaft 40. As a result, the condenser lens 18 is moved in the direction of the optical axis O1 by the rotation of the cam plate 41, so that the light receiving element 14 is moved in the optical axis direction by engagement of the drive pin 14a with the cam groove 42. The condenser lens 18 and the light receiving element 14 are associated with each other in such a way that the light receiving element 14 is moved rearwardly, to a position in which the light receiving element 14A in the second embodiment, illustrated in FIGS. 2A through 2D, is located in a retracted position, shown in FIGS. 3A and 3B. In this position the condenser lens 18 is brought into the optical axis O1, and the light receiving element 14A is moved to a position in which the light receiving element of the first embodiment, illustrated in FIGS. 1A through 1D, is located in a advanced position shown in FIG. 3C in which the condenser lens 18 is retracted from the optical axis O1.

In the embodiment shown in FIGS. 3A through 3C, the slide movement of the slide lever 44 changes the light receiving range of the light receiving element 14A between the narrow range of the first embodiment shown in FIG. 1D, in which the light receiving range is substantially identical to the object distance range, and the wide range of the second embodiment shown in FIG. 2D in which the light receiving range is substantially identical to the field frame.

It is possible to set the light receiving range at an intermediate range between the narrow range and the wide range.

Figure 4A:
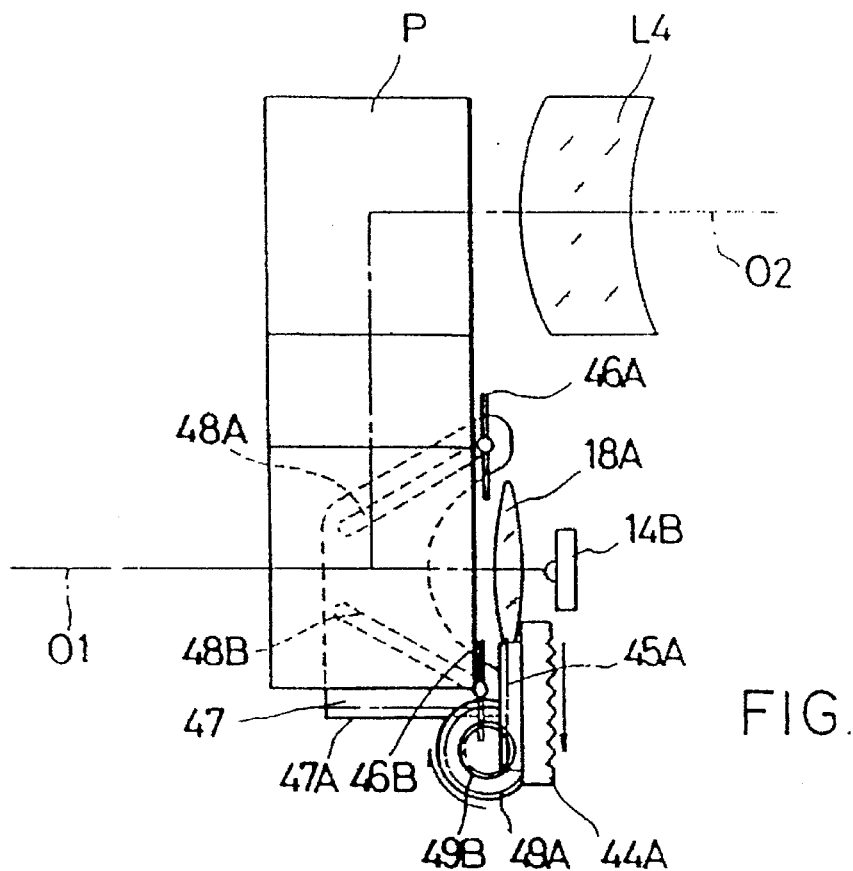
FIG. 4A is a front elevational view of a main part of a switching mechanism of a light receiving range, according to another aspect of the present invention.
Figure 4B:
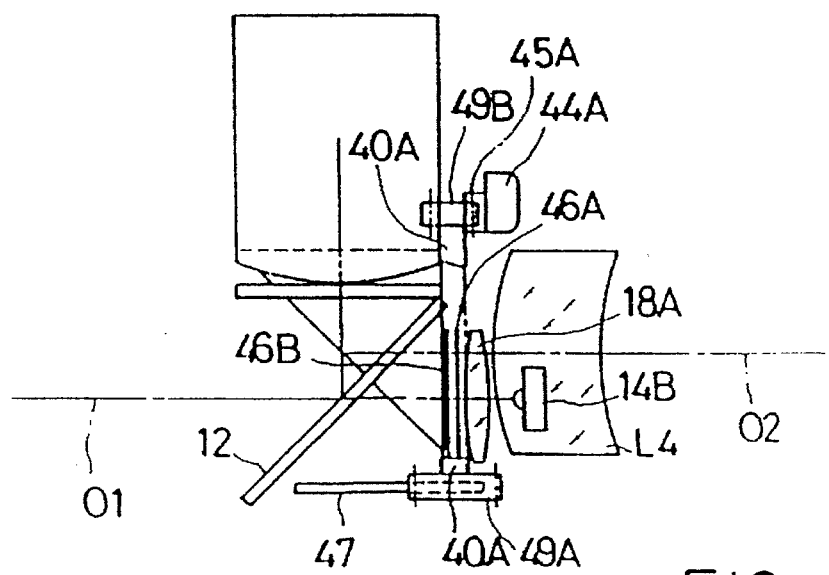
FIG. 4B is a plan view of a main part of FIG. 4A.
Figure 4C:
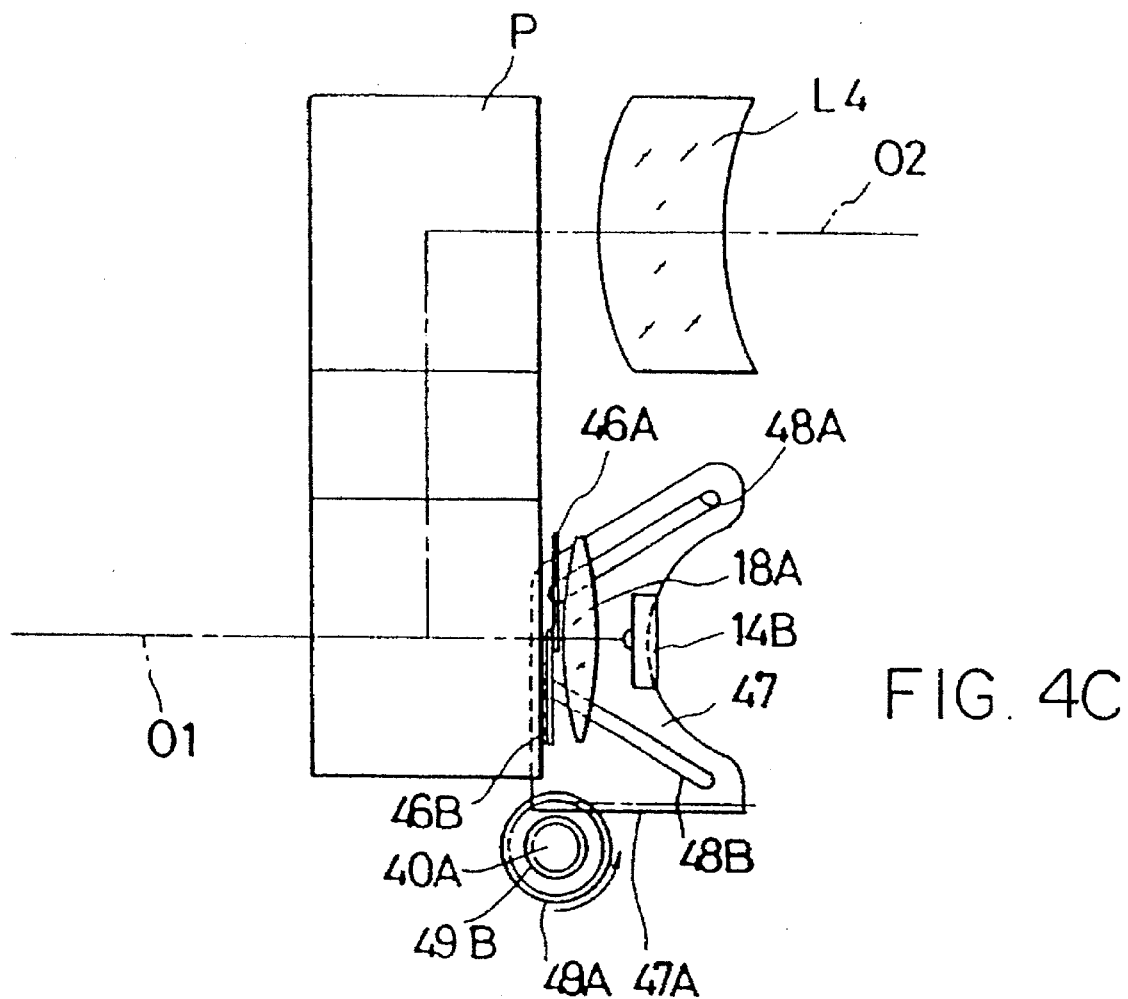
FIG. 4C is a front elevational view of a main part of a switching mechanism of a light receiving range, shown in an operational position different from FIG. 4A.
Figure 5B:
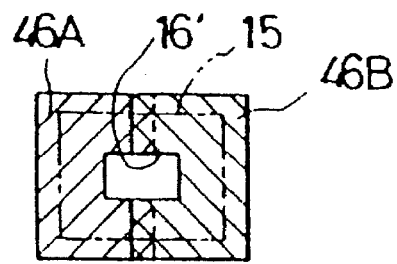
FIGS. 5A and 5B are front elevational views of a split mask for an embodiment shown in FIGS. 4A through 4C, shown in an open position and a light receiving range restricting position, respectively.
Figure 5A:
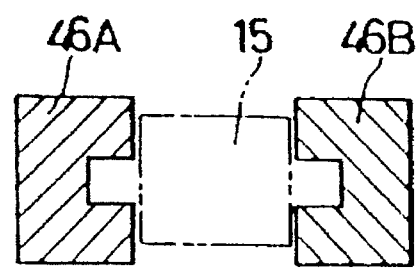

FIGS. 4A, 4B, 4C, 5A and 5B show another embodiment of a light receiving range varying mechanism of the light receiver 14B. The condenser lens 18A is located in front of the light receiving element 14B to gather light within the field frame 15 on the focusing plate 13. A pair of split masks 46A and 46B are provided between the condenser lens 18A and the Porro prism P. The split masks 46A and 46B are movable so as to come away from and close to each other in order to vary the incident range of light received by the light receiving element 14B. Namely, the split masks 46A and 46B define a small center opening 16' when they are partly overlapped, as shown in FIG. 5B, and a fully open field frame 15 when the split masks 46A and 46B are fully spaced apart from one another, as shown in FIG. 5A. The small opening 16' corresponds to the object distance range 16. The split masks 46A and 46B are supported to move in a direction perpendicular to the optical axis O1. At one end of the masks 46A and 46B a cam plate 47 is provided and is movable in a plane parallel with the optical axis O1. The cam plate 47 is provided with a pair of cam grooves 48A and 48B in which drive pins provided on the split masks 46A and 46B are engaged. When the cam plate 47 is linearly moved, the split masks 46A and 46B move between the positions shown in FIGS. 5A and 5B. The cam plate 47 is provided with a rack 47A extending in the direction of the movement thereof and engaging with a gear 49B. The gear 49B which is made integral with the gear 49A through the shaft 40A is in mesh with a rack 45A of the slide lever 44A, so that the slide movement of the slide lever 44A causes the split masks 46A and 46B to come away from and close to each other.

Consequently, when the split masks 46A and 46B are moved to the open position shown in FIGS. 5A and 4A by the slide movement of the slide lever 44A, the light receiving range of the light receiving element 14A is substantially identical to the object distance range 16, and when the split masks 46A and 46B are moved to the light receiving range restricting position shown in FIGS. 5B and 4C, the light receiving range of the light receiving element 14A is substantially identical to the field frame 15, respectively.

Figure 6:
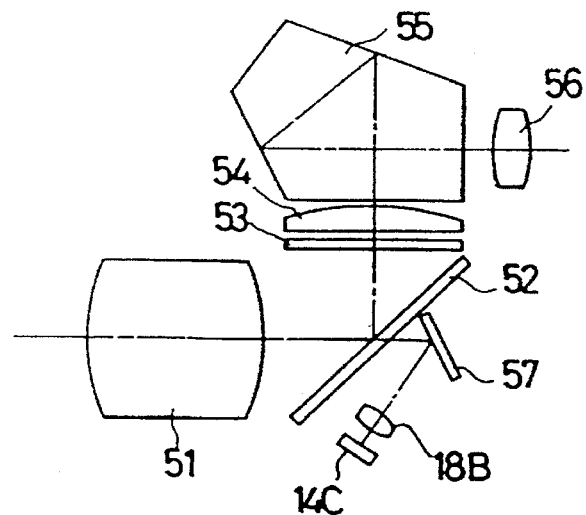
FIG. 6 is a front elevational view of an optical arrangement of an embodiment of the present invention applied to a single lens reflex camera.

FIG. 6 shows an embodiment of the invention applied to a single lens reflex camera. In the single lens reflex camera, a real image type view finder includes a photographing lens 51, a mirror 52, a focusing plate (image forming plane) 53, a condenser lens 54, a pentagonal prism 55 and the eyepiece leds 56. Namely, an image of an object formed by the photographing lens 51, acting as an objective optical system, on the focusing plate 53, is observed through the eyepiece optical system constituted by the eyepiece lens 56 and the condenser lens 54.

An auxiliary mirror 57 is provided behind the mirror 52, which is made as a half mirror at the center portion thereof. A condenser lens 18B and a light receiving element 14C are provided on an optical axis of light reflected by the auxiliary mirror 57. The relationship between the condenser lens 18B and the light receiving element 14C is, for example, the same as that of the condenser lens 18 and the light receiving element 14A in FIGS. 2A through 2C, so that the electromagnetic shutter is released in response to the infrared release signal light emitted from within the picture plane.

In an alternative arrangement, the condenser lens 18B can be removed, and the light receiving element 14B can be moved forward by a predetermined displacement to constitute a remote control apparatus similar to FIGS. 1A through 1C, so that only when the infrared release signal light is emitted from within the object distance range, the electromagnetic shutter is released. It is also possible to apply the switching mechanism shown in FIGS. 3A through 3C to the above-mentioned alternative arrangement.

To apply the switching mechanism shown in FIGS. 4A through 4C, 5A and 5B, to the embodiment shown in FIG. 6, the split masks 46A and 46B are moved to increase and decrease the amount of light received by the condenser lens 18B and the light receiving element 14C which is arranged behind the split masks.

FIGS. 9 through 18 show embodiments of how a focused image of an operator of the remote control apparatus in a zoom lens camera can be taken in a picture plane and the magnification of the image can be adjusted.

The real image type view finder 11 has the same construction as that shown in FIGS. 1A through 1D. Namely, shutter release cannot be effected as long as unfrared release signal light is not emitted from the object distance range 16 shown in FIG. 1D. In other words, the light receiving range of the light receiving element 14 is limited to the object distance range 16, and accordingly, even if the operator, outside the object distance range 16, presses the trigger switch 31 of the light emitter 30 to emit the infrared rays from the light emitting portion 32, the infrared rays are not received by the light receiving element 14. Consequently, when the operator is within the object distance range 16, the remote control photographing can be effected and a picture, in which the operator is in focus can be obtained.

In this embodiment, the magnification of the image by the zoom photographing system 22 can be varied in accordance with the object distance, in addition to the operations mentioned above.

Figure 11:
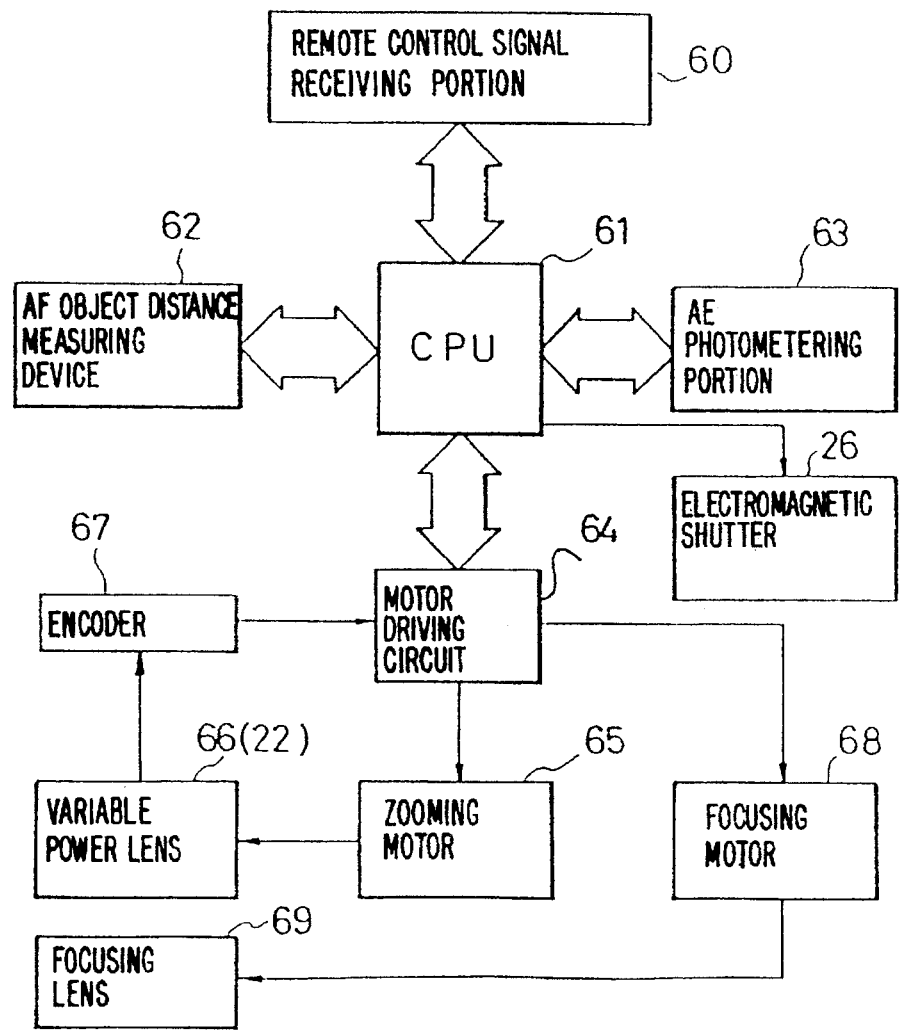
FIG. 11 is a block diagram of an internal circuit of a camera body shown in FIG. 9.

The camera body 20 has a zoom motor 45, as shown in FIG. 11, so that when the zoom motor 65 rotates in a forward or reverse direction, the focal length of the zoom photographing lens system 22 is varied. The change in the focal length takes place in association with the change in the focal length of the zoom finder optical system 11 to make the photographing range substantially identical to the field of view. A zoom lens camera of the kind mentioned above is per se known.

The camera body 20 is provided on its outer face with an AF (Automatic Focusing) infrared light emitting window 62a which constitutes a part of an AF object distance measuring device 62, a light receiving window 62b, and an AE (Automatic Exposure) photometering window 29.

The camera body 20 includes therein a control circuit as shown in FIG. 11.

In FIG. 11, a remote control signal receiving portion 60 outputs a receipt signal to the CPU (Central Processing Unit) 61 when the remote release signal is input from the signal emitter 30 to the light receiving element 14.

The CPU 61 actuates an AF object distance measuring device 62 and an AE photometering portion 63 in response to the input signals from the remote control signal receiving portion 60 and performs the arithmetic (i.e., calculating) operations of automatic focus adjustment, automatic exposure adjustment and automatic focal length adjustment to control a motor driving circuit 64 and the electromagnetic shutter 26, accordance with the input signals from the AF object distance measuring device 62 and the AE photometering portion 63.

The AF object distance measuring portion 62 emits AF infrared rays onto an object (operator carrying the signal emitter 30) at a specific object distance from the light emitting portion (window) 62a in an active triangulation measurement method per se known. The light reflected by the object is received by the light receiving portion 62b, so that the AF object distance measuring portion 62 outputs the object distance signal (represented by the acceptance angle of the reflected light to the CPU 61).

The AE photometering portion 63 determines if the illuminance (brightness) of the area within the photometering range is substantially identical to a predetermined photographing range by the AE photometering window 29 and, if so, converts the detected signals into digital signals by an A/D converter to be output to the CPU 61.

The motor driving circuit 64 drives and controls the focusing motor 68, which is in the form of a stepping motor, to move the focusing lens 69, which is located at an initial position of infinite distance in the optical axis direction, by a displacement determined by a focusing lens displacement signal output from the CPU 61. The motor driving circuit 64 also drives and controls the zooming motor 65 in accordance with the variable power lens displacement signal output from the CPU 61 and moves the variable power lens 66 of the zoom photographing lens 22 in the optical axis direction by a displacement determined by the variable power lens displacement signal. An encoder 67 is, for example, comprised of a code plate which is provided on the cam (used for driving the variable power lens 66) and brushes, which are provided on an immovable portion. The encoder 67 generates digital code signals corresponding to the position of the variable power lens 66, i.e., the set focal length of the zoom lens. The digital code signals are output to the CPU 61 through the motor driving circuit 64 and are stored in the CPU 61.

The electromagnetic shutter 26 opens at a predetermined aperture for a predetermined period of time, in accordance with the release signal, including diaphragm data from the CPU 61, so that a film frame exposed by light transmitted through the zoom lens 22.

Figure 10:
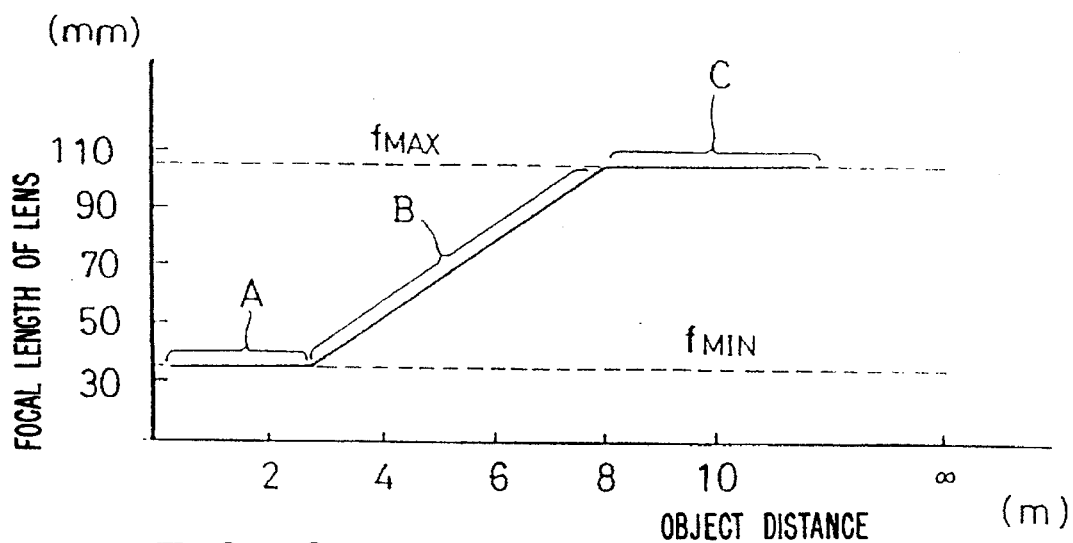
FIG. 10 is a program diagram of an automatic focus adjustment according to an embodiment shown in FIG. 9.

The following discussion will be directed to a program of an automatic focal length adjustment, with reference to FIG. 10 which shows a program diagram thereof. In FIG. 10, the ordinate represents the focal length f of the lens and the abscissa represents the photographing distance, i.e., the object distance D, respectively.

As is well known, the following relationship is satisfied;

$$\beta = f/D$$

wherein $\beta$ designates the magnification.

To make the magnification constant, the focal length f must be varied so as to satisfy (f=$\beta \times$D), in accordance with the change of the object distance D, thereby to always make constant the size of an object's (operator's) image with respect to the image frame. This has been taken into account in the program diagram shown in FIG. 10 in which the magnification $\beta$ is 0.013 ( $\beta$=0.013; whole body mode) so as to take a picture of a whole body of an operator of average height within the image frame.

Since there is a limit to the focal length of the zoom lens mounted to the camera body, it is impossible to always satisfy the formula $\beta$=f/D for all object distance ranges. In FIG. 10, the focal length range is maximum (fmax) and minimum (fmin) on the telephoto side and the wide angle side, respectively. In the case of an object (operator) being at an object distance closer than fmin, the focal length is maintained at a constant level of fmin (represented by "A" in FIG. 10). Conversely, in the case of an object at an object distance farther than fmax, the focal length is maintained on a constant line of fmax (represented by "C" in FIG. 10). In these cases, there is a large change in magnification.

In case of an object at an intermediate object distance between fmax and fmin, the focal length f is varied to make the magnification constant in accordance with the object distance, as designated at "B" in FIG. 10.

Figure 12:
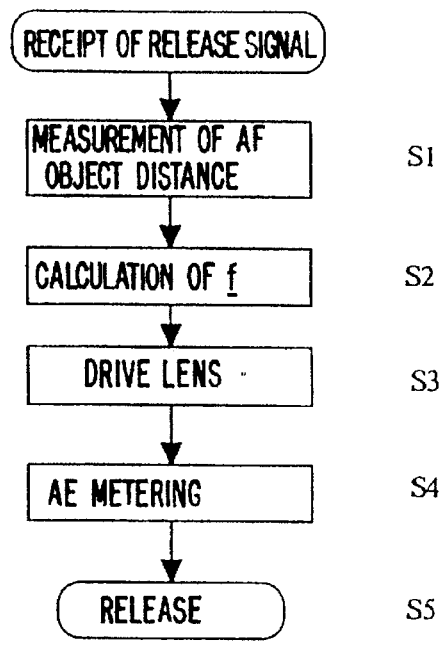
FIG. 12 is a flow chart of Control operations of a camera body shown in FIG. 9.
Figure 13:
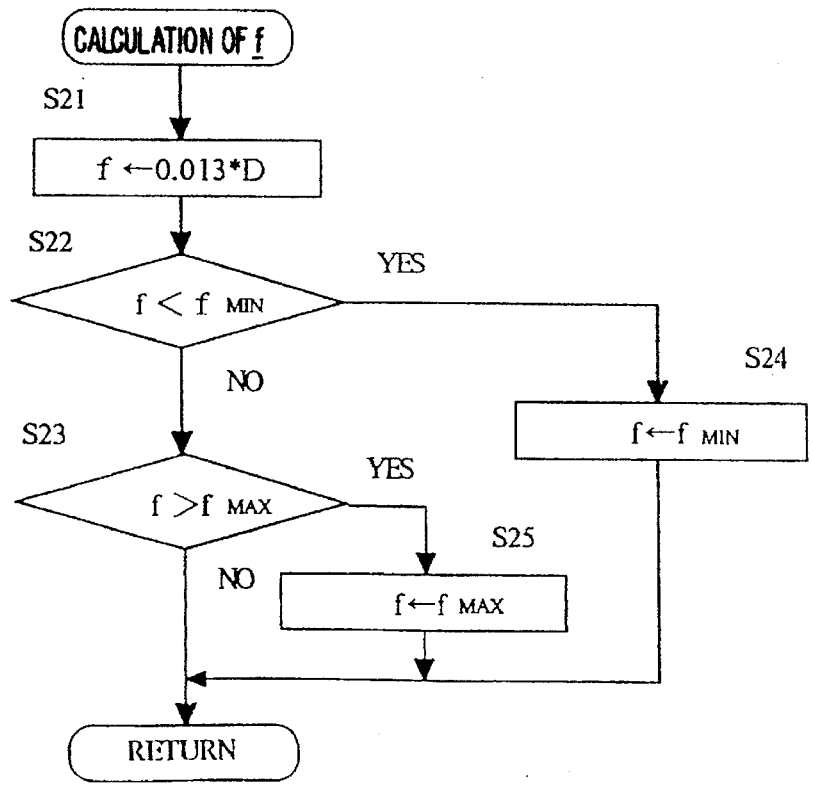
FIG. 13 is a flow chart for an f-calculation shown in FIG. 12.

The operation of the CPU 61 to perform the automatic focal length adjusting program is as follows (FIGS. 12 and 13).

In FIG. 12, which shows a main flow chart of the operation, the CPU 61 commences the operation upon receipt of the receipt signal from the remote control signal receiving portion 60.

At step S1, the AF object distance measurement is carried out. Namely, the operation signal is output to the AF object distance measuring portion 62 to perform the light emitting and receiving operation. The data of the direction of the emission of the infrared rays, i.e., the acceptance angle $\theta$ of light of the closest object (operator as an object to be photographed) within the object distance range at the light receiving portion 62b is input to the CPU 61. Thereafter, the object distance D of the object (operator) is calculated in accordance with the data of the acceptance angle $\theta$ and the predetermined data of base length "a" between the light emitter 62a and the light receiver 62b. The object distance D is given by the known formula (D=a $\times$tan $\theta$). The object distance D thus detected, is used as address information, based on which the corresponding drive pulses of the focusing motor 68, stored in the memory of the CPU 61, are read out.

Thereafter, at step S2, the focal length f is calculated. The focal length is obtained in accordance with the sub-routine shown in FIG. 13. Namely, the object distance D in formula f=0.013 $\times$D is substituted with the value of D obtained to obtain the value of the focal length f at step S21. Then, at steps S22 and S23, the value of the focal length f is compared with fmin and fmax, respectively. If the value f is smaller than fmin at step S22, the focal length f is set to be fmin at step S24. Conversely, if the focal length f is larger than fmax at step S23, the focal length f is set to be fmax at step S25. If the focal length f is an intermediate value between fmin and fmin, the calculated focal length is maintained as it is, and the control is returned to the main routine.

In the main routine shown in FIG. 11, the lens is moved at step S3. Namely, a difference value between the focal length f calculated at step S2 and the presently set focal length fa of the zoom lens 22, read out from the encoder 67, is input as a variable power lens displacement signal to the motor driving circuit 64. As a result, the variable power lens 66 is moved by the displacement determined in accordance with the variable power lens displacement signal. If the difference (f–fa) is a positive value or negative value, the zooming motor 65 is rotated in the forward direction (telephoto direction) or the reverse direction (wide angle direction), respectively. When the difference (f–fa) is zero, the zooming motor 65 is stopped. On the other hand, the number of the drive pulses of the focusing motor 68 obtained at step S1 is output as a focusing lens displacement signal to the motor driving circuit 64 so that the focusing motor 68 will move the focusing lens 69 to a focal position.

Thereafter, at step S4, the AE photometering is effected. Namely, the operation signal is output to the AE photometering portion 63 to detect the illuminance of the object and perform a predetermined automatic exposure calculation in order to obtain a diaphragm value and a shutter speed.

When above-mentioned operations are completed, the release signal is output to the electromagnetic shutter 26 at step S5, so that the shutter is opened at an aperture corresponding to the diaphragm value calculated at step S4 for a predetermined period of time corresponding to the shutter speed calculated at step S4.

The operation of the remote control apparatus of the present invention is as follows.

The operator presses the trigger switch 31 of the signal emitter 30 at the front of the camera body to emit the infrared rays (release signal light) toward the camera body. In this case, since the light receiving range of the light receiving element 14 is limited to the object distance range 16, as mentioned above, when the operator is outside the object distance range 16, even if the trigger switch 31 of the signal emitter 30 is pressed by the operator to emit the infrared rays from the light emitting portion 32, the infrared rays are not received by the light receiving element. Consequently, the CPU 61 does not commence the operations shown in FIG. 12, and accordingly, no releasing operation is effected. Therefore, when the CPU 61 commences the operations of FIG. 12 upon receipt of the infrared rays, the operator is within the object distance range 16, and, in most cases, a picture in which the operator is in focus can be easily taken.

Figure 14A:
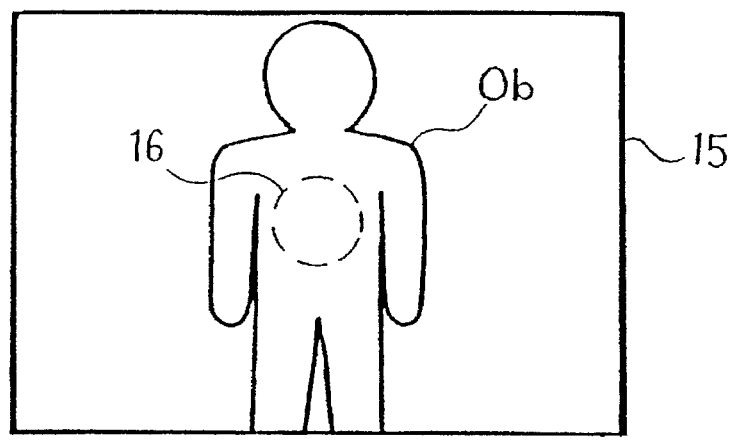
FIGS. 14A, 14B and 14C are schematic views of an image plane for explaining the operation of the invention.
Figure 14B:
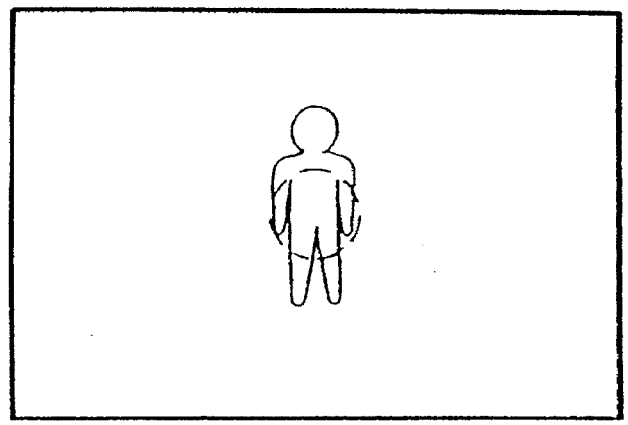
Figure 14C:
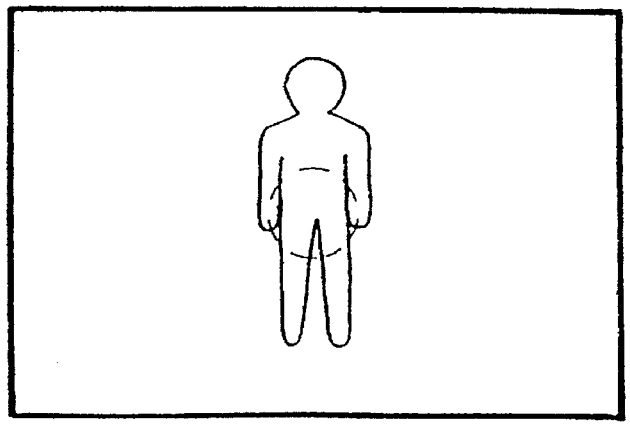
Figure 15A:
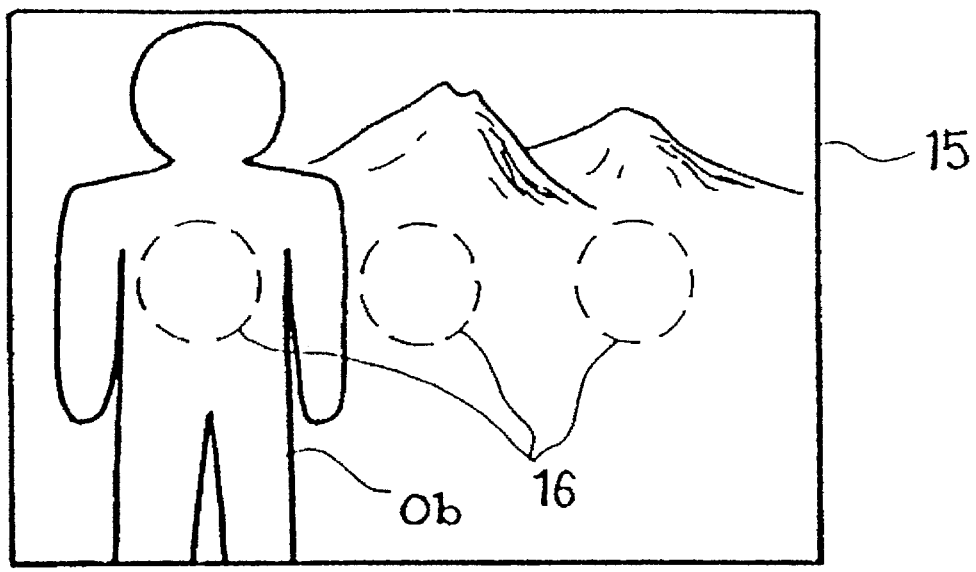
FIGS. 15A and 15B are schematic views of an image plane, for explaining the operation in another embodiment of the present invention.
Figure 15B:
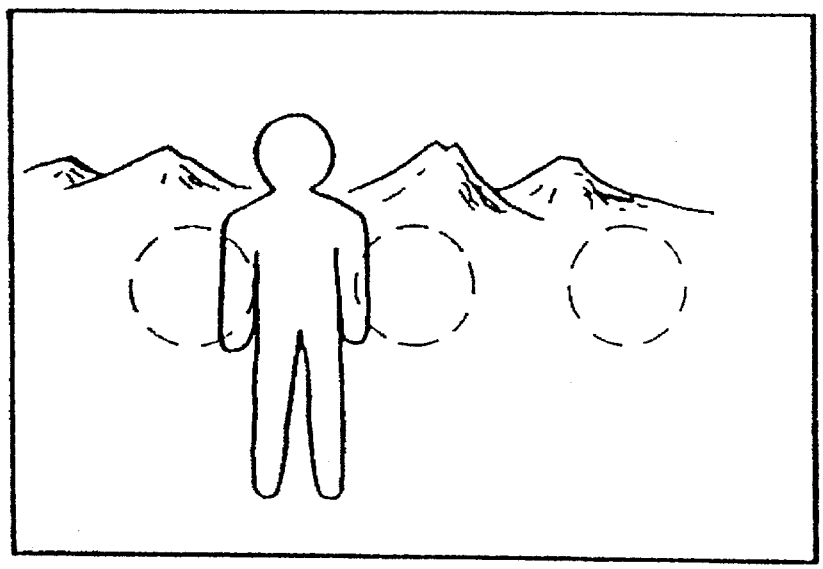

Furthermore, the focal length varies in accordance with the changes in the object distance, to always keep constant the magnification of the object image, within the zooming range. Namely, even if the operator is very close to the camera, so that an image Ob of the operator is too large to be accommodated in the picture frame 15, as shown in FIG. 14A, or even if the operator is very far from the camera, so that the image Ob of the operator is too small with respect to the picture frame, as shown in FIG. 14B, the magnification of the image can be automatically adjusted to a proper value at which a reasonable object image size can be realized, as shown in FIG. 14C. Thus, the operator can take his or her portrait in an intended composition.

Although the light receiving element 14 of the light receiver is located at a position equivalent to the image forming position of the real image type view finder 11 to restrict the light receiving range in the above-mentioned embodiments, the present invention is not limited thereto. For instance, it is possible to provide a light receiving element separate from the view finder. In this alternative, a mask is provided in front of the light receiving surface of the light receiving element to be coincidental with the object distance range.

The present invention can be also applied to a so-called multi-point object distance measuring type of camera having a plurality of object distance, ranges, and plurality of light receiving elements. In this case, a main object Ob (operator) is selected from a plurality of objects caught by the object distance ranges 16 by a known selecting means, as shown is FIG. 15A. The automatic focal length adjustment is similarly carried out for the selected main object.

It is also possible to optionally set the magnification or to gradually vary the magnification to enlarge the object distance range in which the automatic focal length adjustment can be effected.

Furthermore, the present invention can even be applied to a pan-focus (or "focus-free") zoom lens camera in which no adjustment of the focal length is necessary or to a manual zoom lens camera in which the focus adjustment is manually effected.

Figure 16:
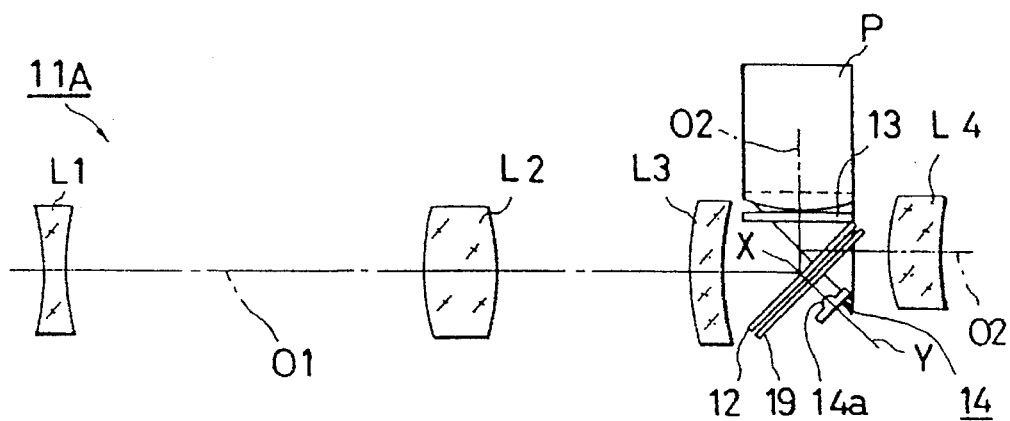
FIG. 16 is a view of an optical arrangement of a real image type of view finder similar to FIG. 1B.
Figure 17:
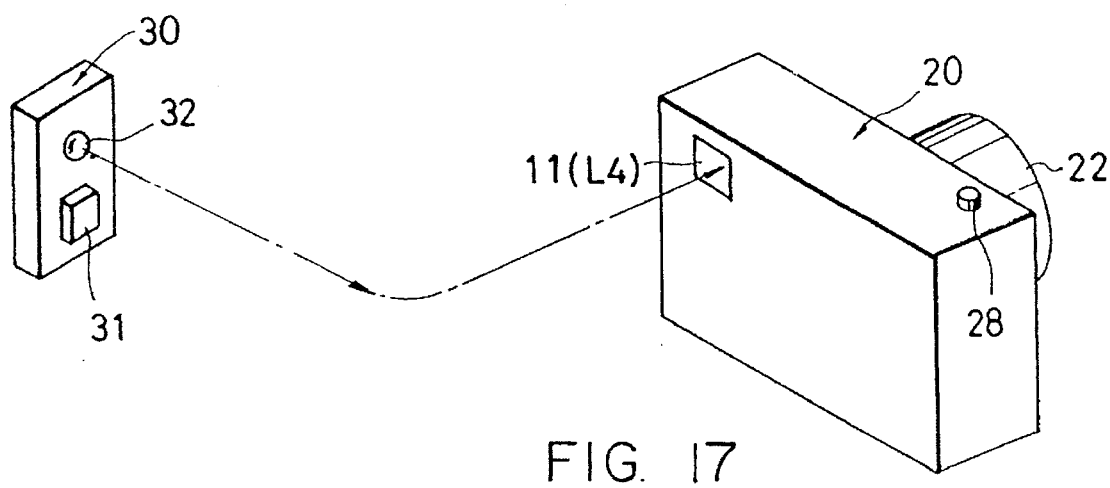
FIG. 17 is a perspective view of a signal emitter and a camera body, according to another aspect of the present invention; and, FIG. 18 is a perspective view of a Porro prism in a real image type of view finder according to the present invention.
Figure 18:
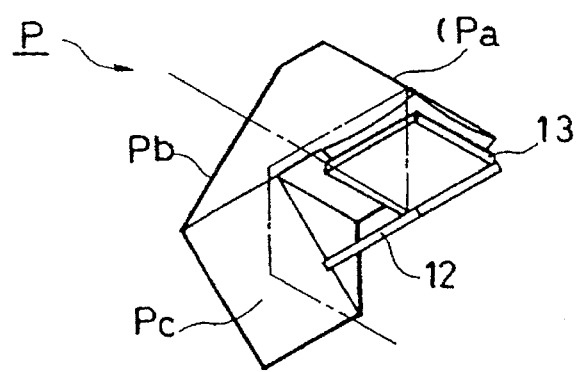

FIGS. 16 through 18 show another embodiment of the present invention in which remote control photographing can be effected regardless of the position of the operator of the remote control apparatus in front of or behind the camera. The basic construction of the real image type of view finder 11A in this embodiment is similar to that the view finder 11 shown in FIGS. 1A through 1D. FIG. 16 corresponds to FIG. 1B.

The half mirror 12 connects the optical axis O1 of the objective optical system and the optical axis O2 of the eyepiece optical system thereto. The external light made incident upon the half mirror 12 both from the objective optical system and from the eyepiece optical system is partly transmitted through the half mirror. The Porro prism P has first and second reflection surfaces Pa and Pb for inverting the right and left sides of the object image formed on the focusing plate 13 by the objective optical system, as shown in FIG. 18. The Porro prism P also has a third reflection surface Pc for adjusting the posture (i.e. inverting) of the object image in the vertical direction so as to observe the object image. The Porro prism P makes the optical axis O2 of the eyepiece optical system parallel with the optical axis O1 of the objective optical system.

In the illustrated embodiment, a diffusive transmission plate 19 which is made of frosted glass or the like is provided behind the half mirror 12 on the transmission side thereof. The light receiving element 14 of the light receiver which constitutes a remote control apparatus is provided on the side opposite to the half mirror 12 with respect to the diffusive transmission plate 19. The light receiving element 14 is located on a line Y extending normal to the half mirror 12 from a reflection point X at which light on the optical axis O1 is reflected by the half mirror 12. The light receiving surface 14b of the light receiving element 14 faces the reflection point X.

In the embodiment shown in FIGS. 16 through 18, when the operator takes his or her own picture, the operator presses the trigger switch 31 of the light emitter 30 from the front side of the camera to emit the infrared release signal light toward the camera.

In this case, assuming that the light emitting portion 32 of the light emitter (signal emitter) 30 is located on an extension of the optical axis O1, the infrared rays are partly reflected by the half mirror 12 at the reflection point X toward the focusing plate 13 and are partly transmitted through the half mirror 12 to be in parallel with the optical axis O1 and diffused in different directions by the diffusive transmission plate 19. Part of the diffused rays of light is then made incident upon the light receiving surface 14b of the light receiving element 14, so that the latter, as a signal receiving portion, outputs the release signal to a control device (not shown) of the camera to effect the releasing.

Conversely, even if the light emitting portion 32 of the light emitter 30 is not located on the optical axis O1 so that the infrared rays are transmitted through the half mirror 12 at positions different from the reflection point X, as long as the infrared rays are transmitted through the diffusive transmission plate 19 to be diffused thereby, the diffused rays are made partly incident upon the light receiving surface 14b of the light receiving element 14. Consequently, even if the release signal is emitted from a wide area before the camera body 20, the releasing can be carried out.

Upon taking a picture from behind the camera, the operator presses the trigger switch 31 of the signal emitter 30 from behind the camera body 20 to emit the infrared rays toward the camera, as shown in FIG. 17. In this case, if the light emitting portion 32 is located on an extension of the optical axis O2, the infrared rays pass the eyepiece L4, the Porro prism P, the focusing plate 13 on the optical axis O2 and are partly reflected by the half mirror 12 at the reflection point X toward the filed lens L3. On the other hand, a part of the infrared rays transmitted through the half mirror 12 to be parallel with the optical axis O2 is transmitted through the diffusive transmission plate 19 and diffused thereby in different directions. The diffused rays are partly made incident upon the light receiving surface 14b of the light receiving element 14, so that the latter, as a signal receiver, outputs the release signal to a controller (not shown) of the camera to effect the releasing.

Conversely, even if the light emitting portion 32 of the light emitter 30 is not located on the optical axis O2, so that the infrared rays are transmitted through the half mirror 12 at positions different from the reflection point X, as long as the infrared rays are transmitted through the diffusive transmission plate 19 to be diffused thereby, the diffused rays are partly made incident upon the light receiving surface 14b of the light receiving element 14. Consequently, even if the release signal is emitted from a wide area after the camera body 20, the releasing can be carried out.

As can be seen from the foregoing, in the embodiment illustrated in FIGS. 16 through 18, since the light receiving element 14 is located on the line Y which defines the same angle with respect to the optical axes O1 and O2, the light receiving element 14 can equally receive the infrared rays emitted either from the side of the objective optical system (L1, L2, L3) or from the side of the eyepiece optical system (L4), with the same sensitivity.

Although there is no limit to the position of the half mirror 12 in the illustrated embodiment, the half mirror 12 is preferably located in the vicinity of the image forming position, i.e., the focusing plate 13, so that for the infrared rays emitted from the front of the camera body 20, only those from the photographing range by the photographing lens 22 can be received. In this case, for instance, a mask can be provided behind the half mirror 12 to permit only the infrared rays from the photographing range to pass therethrough. Consequently, shutter release can be effected to take the operator's picture, only when the operator is within the photographing range. The embodiment illustrated in FIGS. 1A through 4B can be applied to the embodiment illustrated in FIGS. 16 through 18.

It is possible to use the half mirror 12 which has a surface made of frosted glass on the transmission side thereof to constitute a diffusive transmission means without providing the diffusive transmission plate 19 separate from the half mirror 12.

It is possible to enlarge the light receiving range of the light receiving element 14 to some extent without providing the diffusive transmission plate 19.

I claim:

1. A camera comprising:

a view finder;

an electromagnetic shutter;

a half mirror provided in an optical path of said view finder to partly transmit a remote release signal light and to partly reflect the remote release signal light;

at least one light receiving element provided on a transmission side of said half mirror; and releasing means for releasing said electromagnetic shutter of the camera in response to said light receiving element receiving the remote release signal light.

2. A camera according to claim 1, further comprising a signal emitter which emits the remote release signal light.

3. A camera according to claim 1, wherein said view finder comprises an objective optical system for forming a real image of an object to be taken, and an eyepiece optical system through which the real image of the object is observed.

4. A camera according to claim 3, wherein said light receiving element is located at a position substantially conjugate with an image forming plane of said view finder.

5. A camera according to claim 4, further comprising a photographing optical system separate from said real image type view finder.

6. A camera according to claim 4, wherein said camera is a single lens reflex camera.

7. A camera according to claim 4, wherein said real image type view finder is a view finder for a single lens reflex camera.

8. A camera according to claim 4, wherein said light receiving element has a predetermined light receiving range.

9. A camera according to claim 8, further comprising varying means for varying the light receiving range of said light receiving element.

10. A camera according to claim 9, wherein said varying means varies the light receiving range of said light receiving element between a narrow range and a wide range.

11. A camera according to claim 9, further comprising a condenser lens for gathering the remote release signal light.

12. A camera according to claim 11, wherein said varying means comprises first moving means for moving said light receiving element in the optical axis direction and second moving means for moving said condenser lens between an advanced position in which said condenser lens is located on the optical axis of said light receiving element and a retracted position in which said condenser lens is retracted from the optical axis of said light receiving element in accordance with the movement of said light receiving element.

13. A camera according to claim 10, wherein said varying means comprises a movable mask which selectively moves to the front of said light receiving element to vary the incident range of light incident upon said light receiving element.

14. A camera according to claim 4, further comprising an automatic focusing device for detecting the distance of an object within an object distance measuring zone, and a motor driven zoom lens.

15. A camera according to claim 14, further comprising focal length control means for controlling the focal length of the motor driven zoom lens in accordance with the object distance detected by the automatic focusing device.

16. A camera according to claim 15, wherein the light receiving range of said light receiving element corresponds to the object distance measuring zone of said automatic focusing device.

17. A camera according to claim 1, wherein said camera comprises a plurality of light receiving elements and an automatic focusing device for detecting an object distance of an object, said automatic focusing device being provided with a plurality of object distance measuring zones.

18. A camera according to claim 14, wherein said motor driven zoom lens comprises a variable power lens.

19. A camera according to claim 18, said focal length control means comprises arithmetic operation means for calculating the focal length corresponding to the specific magnification of an image of the object, and drive means for driving the variable power lens of the motor driven zoom lens in accordance with results of the calculation of the arithmetic operation means.

20. A camera according to claim 4, wherein said light receiving element is located on a line normal to a reflection surface of the half mirror or the vicinity thereof.

21. A camera according to claim 20, further comprising light diffusion means on a side of the half mirror near said light receiving element.

22. A camera according to claim 21, wherein said light diffusion means comprises a diffusion plate separate from the half mirror.

23. A camera according to claim 21, wherein said light diffusion means comprises a diffusion layer formed directly on a side face of half mirror close to light receiving element.

24. A camera according to claim 2, further comprising an external light receiving element provided on a outer surface of the camera to receive the remote release signal light emitted from the signal emitter to thereby release the electromagnetic shutter.

25. A camera according to claim 24, further comprising switching means for selectively actuating said external light receiving element and said light receiving element provided on a transmission side of the half mirror.

26. A camera system including a remote controller, comprising:
- a signal emitter for emitting remote release signal light;
- a camera body having a view finder and an electromagnetic shutter,
- a light receiving element provided in said view finder to receive the remote release signal light incident thereon from an objective optical system side of said view finder and from an eyepiece optical system side thereof; and
- releasing means for releasing the electromagnetic shutter of the camera body in response to said light receiving element receiving the remote release signal light from the signal emitter.

27. A camera according to claim 26, further comprising a half mirror provided in said view finder to partly transmit and partly reflect the light made incident thereon from the objective optical system side and the eyepiece optical system side thereof.

28. A camera according to claim 26, wherein said light receiving element is provided on a transmission side of the half mirror.

29. A camera according to claim 26, wherein said view finder is a real image type of finder.

30. A camera according to claim 29, wherein said light receiving element is located at a position substantially conjugate with the image forming plane of the objective optical system of said real image type of finder.

31. A camera system including a remote controller, comprising:
- a signal emitter for emitting remote release signal light;
- a camera body having a real time type of view finder and an electromagnetic shutter; and
- a signal receiver which receives the remote release signal light emitted from the signal emitter to actuate the electromagnetic shutter in response to the signal receiver receiving the remote release signal light, said signal receiver being provided with a light receiving element which is located at a position substantially conjugate with an image forming plane of the objective optical system of the real image type of view finder.

32. A camera according to claim 31, further comprising a photographing optical system separate from the real image type of view finder.

33. A camera according to claim 32, wherein said real image type of view finder is a view finder for a single lens reflex camera.

34. A camera according to claim 31, further comprising varying means for varying the light receiving range of the light receiving element within the image forming plane.

35. A camera according to claim 34, further comprising a condenser lens for gathering the remote release signal light.

36. A camera according to claim 35, wherein said varying means comprises first moving means for moving the light receiving element in the optical axis direction and second moving means for moving the condenser lens between an advanced position in which the condenser lens is located on the optical axis of the light receiving element and a retracted position in which the condenser lens is retracted from the optical axis of the light receiving element in accordance with the movement of the light receiving element.

37. A camera according to claim 35, wherein said varying means comprises a movable mask which selectively moves to the front of the light receiving element to vary an incident range of light incident upon the light receiving element.

38. A camera system including a camera body with a view finder and a zoom lens as a photographing lens, comprising:
- a remote control apparatus including a signal emitter for emitting a remote release signal light and a signal receiver disposed in the view finder of the camera body for receiving the remote release signal light to output a release signal;
- object distance measuring means for detecting the distance of an object to be taken;
- light receiving range restricting means for making a light receiving range of the signal receiver coincident with an object distance range of the object distance measuring means; and,
- focal length varying means for varying the focal length of the zoom lens in accordance with the object distance detected by the object distance measuring means.

39. A camera system according to claim 38, wherein said zoom lens includes a variable power lens.

40. A camera system according to claim 39, wherein said focal length varying means comprises arithmetic operation means for calculating the focal length which gives a constant magnification of an image of the object, and drive means for driving the variable power lens of the zoom lens in accordance with the output of the arithmetic operation means.

41. The camera according to claim 1, said light receiving element being sensitive to remote release signal light from a remote controller.

42. The camera according to claim 41, wherein said remote release signal light comprises infrared light.

43. The camera system according to claim 26, said light receiving element being sensitive to remote release signal light from said remote controller.

44. The camera system according to claim 43, said remote release signal light comprising infrared light.

45. The camera system according to claim 31, said light receiving element being sensitive to remote release signal light from said remote controller.

46. The camera system according to claim 45, said remote release signal light comprising infrared light.

* * * * *